Jan. 13, 1970  F. W. KIEFFER  3,489,403
TWIST-LOCK SPRING LIFTER
Filed July 29, 1968
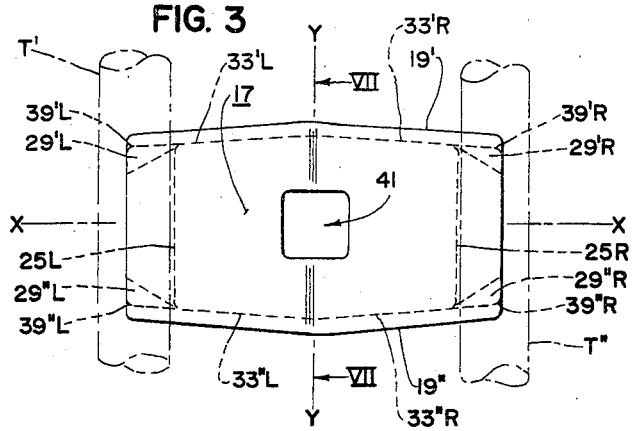
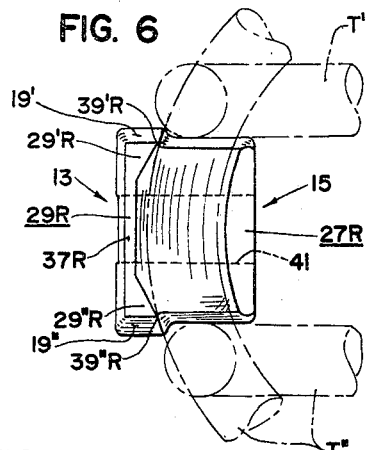
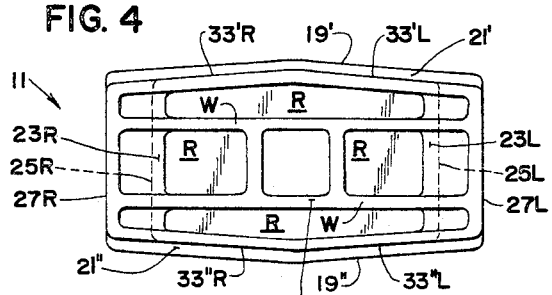
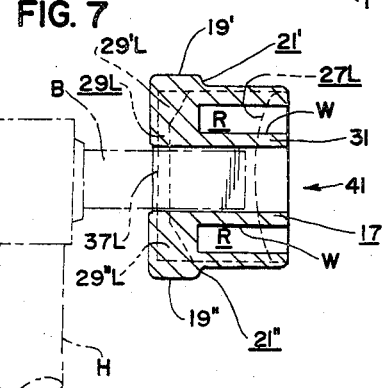
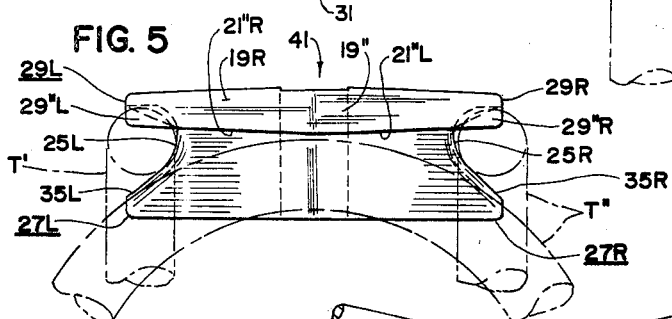
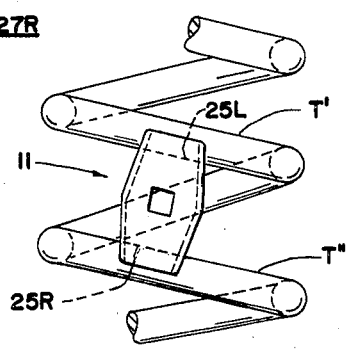
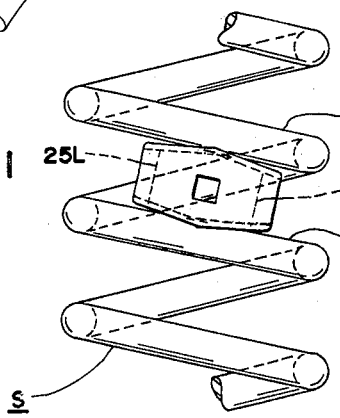
INVENTOR.
FRED W. KIEFFER
BY John R. Walker, III
Attorney

United States Patent Office 3,489,403
Patented Jan. 13, 1970

3,489,403
TWIST-LOCK SPRING LIFTER
Fred W. Kieffer, 259 Gardenia Drive,
Memphis, Tenn. 38117
Filed July 29, 1968, Ser. No. 748,554
Int. Cl. F16f *1/12;* B60g *11/54*
U.S. Cl. 267—61                                                6 Claims

ABSTRACT OF THE DISCLOSURE

A small blocklike lifter adapted for use in lifting upper turns of a large helical vertically arranged compression spring of the type utilized in automotive suspension systems. The blocklike lifter having flattened side portions and lock portions on opposite ends. The lifter being adapted to be horizontally flatwise inserted between adjacent turns of the helical spring and then turned 90° to a vertical disposition with opposite end lock portions of the lifter permanently engaging the vertically confronting adjacent spring turn portions of a helical spring.

BACKGROUND OF THE INVENTION

Field of the invention

Relates to small blocklike devices generally known in the automobile art as lifters, boosters, spring spreaders or the like.

Description of the prior art

Generally, there are two types of spring lifters. (1) The lifter which is installed in an automotive type helical spring by spreading the spring and then inserting the lifter between the spread turns of the spring. (2) Spring lifter or spring spreading devices which are turnlocked into place in a helical spring and by spreading the spring as the device is being inserted or installed. Spring spreader devices of the first-mentioned type may be seen in Patents No. 2,854,231 and 2,904,329. In the spring spreading devices of these patents the particular device is inserted between the coils of a helical spring by first lifting the load on the spring or stretching the spring coils to allow insertion of the particular spring spreading device.

A particular problem with certain spring spreader block devices is the tendency for an installed device to pop out of the spring turns as the automotive vehicle is being used. Not infrequently, a device will jump out from between the spring turns as the automotive vehicle passes over a severe rough spot in the road. To reduce the likelihood of such as this occurring, certain solid metal spring spreaders are formed partially of resilient material, or at least the portion of the spring lifter which engages the spring turns is formed of resilient material or a material having a high resistance to frictional movement. Many devices, such as the lifter device disclosed in Patent No. 2,854,231 are formed substantially entirely of rubber material. Although the use of rubber material reduces the likelihood of a spring booster block jumping from the spring turns of a helical spring, the resilient material weathers and deteriorates with age and use and loses its resiliency and effectiveness. To compensate for this, certain spring block devices, as the device illustrated in Patent No. 2,854,231, provide bolt means for adjusting the spread of the rubber spring block.

Patent No. 3,091,448 discloses a turnlock type spring lifter of my earlier invention. The spring lifter body of this earlier invention is configured generally in the form of a tapered double thread screw having oppositely arranged paired ridges running helix-fashion about the body of the spring lifter device. My earlier lifter device included structure adapted for engagement with a wrench and the device was inserted or installed between the helical spring turns by rotating the device 180°. My prior lifter device has proved very effective for use in lifting or boosting the front coil springs of an automobile; however, many current model automobiles are provided with rear coil springs having wide spacings between adjacent turns of the springs; in current makes of automobiles a rear coil spring of the automobile may have substantially wider spacing between the turns of the spring than do the spring turns of the automobile front spring. The particular configuration of my prior spring lifter (Patent No. 3,091,448) generally is not applicable for spreading the turns of coil springs having wide spacing between the coil spring turns. The lifter device of the present invention, although applicable for spreading the closely spaced turns of a front coil spring of an automobile, is particularly directed for use in spreading the spring turns of a rear coil spring of an automobile.

SUMMARY OF THE INVENTION

The present invention provides a simple lightweight blocklike twistlock spring lifter which is easy to install. By simply placing the lifter flatwise between two adjacent spring turns, and turning the lifter one-quarter turn, the lifter is twistlocked permanently in place. Although preferable formed entirely of metal, the lifter device of the present invention includes locking means which prevents the device from inadvertently jumping out from between the coil spring turns when the automobile passes over a bump or rough road surface. The device is not formed of rubber nor does it include rubber parts to deteriorate and loose resiliency; the metal spring lifter device of the invention maintains its effectiveness indefinitely and is substantially not affected by age or use.

BRIEF DESCRIPTION OF THE DRAWINGS

FIGS. 1 and 2 illustrate the installation of the device in a vertically arranged helical compression spring: FIG. 1 illustrates the lifter device in an initial position arranged flatwise between adjacent spring turns of the compression spring; FIG. 2 illustrates the lifter device after it has been turned a quarter turn and is permanently positioned between the spring turns.

FIGS. 3 is a front face view of the lifter device.

FIG. 4 is a rear face view of the device.

FIG. 5 is a bottom view of the device taken as from FIG. 3.

FIG. 6 is an end view taken as from the right of FIG. 3.

FIG. 7 is a vertical plane cross-sectional view taken as on the line VII—VII of FIG. 3.

DESCRIPTION OF THE PREFERRED EMBODIMENT

The lifter device of the present invention is indicated by numeral 11 and will be described in conjunction with an automotive type vertically arranged helical compression spring S having spring turns T' and T''. In the following description of lifter 11, for purposes of clarity, the lifter will be considered as being arranged generally in a horizontal disposition, particularly as seen in FIGS. 1 and 3, and also having a front face 13 and back face 15. Also, for purposes of clarity, lifter 11 will be defined with reference to a horizontal datum plane X, X and vertical datum plane Y, Y intersecting at the center of the lifter, as viewed toward the front or back face 13, 15 (see FIG. 3). Spring lifter 11 preferably is symmetrical in length and height and preferably cast-formed of lightweight aluminum alloy material.

Lifter 11 includes a generally oblong body 17; preferably upper and lower abutment rib structures 19', 19'' defining respectively abutment edge surfaces 21', 21''; left and right spring turn seating structures 23L, 23R defining respectively oppositely facing spring turn seating surfaces 25L, 25R; locking lug structure arranged respectively on opposite end portions of lifter 11 including left crowder lock lug structure 27L, 27R and spur lock lug structure 29L, 29R; and wrench-engaging structure 31. Lifter 11 also preferably is provided with a plurality of recesses R in its back face 15 defining horizontally and vertically extending webs W (see FIGS. 4 and 7); lifter 11 is preferably formed thusly for economy in use of construction metal and for forming a lighter lifter for reducing mass and inertia in an application in an automobile spring.

Spring lifter body 17 defines substantially upwardly and downwardly oriented leverage surfaces respectively 33′L, 33′R and 33″L, 33″R arranged respectively symmetrically of horizontal and vertical datum planes X, X and Y, Y. Upper and lower left leverage surfaces 33′L, 33″L of body structure 17 preferably extend leftward convergingly from vertical datum plane Y, Y. In like manner, upper right and lower right leverage surfaces 33′R, 33″R preferably extend convergingly rightward from vertical datum plane Y, Y. Leverage surfaces 33′L, 33′R and 33″L, 33″R preferably protrude oppositely outwardly respectively at vertical datum plane Y, Y and form contour intersections respectively with left and right spring turn seating surfaces 25L and 25R. The oppositely converging leverage surfaces 33′L, 33″L and 33′R, 33″R permit greater torsional force to be effectively exerted on the lifter in installing the lifter between adjacent spring turns; the oppositely converging leverage surfaces permits ready installation of the lifter device by turning either clockwise or counter-clockwise: When inserting lifter 11 by turning the lifter in a clockwise direction, upper left leverage surface 33′L and lower right leverage surface 33″R simultaneously engage respectively upper and lower spring turns T′, T″ and spread the spring turns apart. This is somewhat of a rocking motion in which the lifter 11 is turned or rocked into place which otherwise would not occur if the surfaces 33′L and 33′R were in the same plane and the surfaces 33″L and 33″R were in the same plane. When inserting lifter 11 by turning in a counterclockwise direction, upper leverage surface 33′R and lower leverage surface 33″L simultaneously engage respectively upper and lower spring turns T′, T″ for spreading the spring turns.

Upper and lower abutment rib structures 19′, 19″ preferably extend respectively along the upper and lower horizontal portions of body structure 17 and along front face 13 of lifter 11. Abutment rib structures 19′, 19″ limit the inward displacement of lifter 11 during installation of the lifter (see FIG. 6). Abutment edge surfaces 21′, 21″ are respectively oriented toward rear face 15 of lifter 11 and respectively adapted to runningly engage spring turn portions of turns T′, T″ as the lifter is being installed. Abutment edge surfaces 21′, 21″ preferably project uniformly respectively from upper and lower leverage surfaces 33′L, 33′R and 33″L, 33″R and preferably extend respectively the full longitudinal extension of lifter 11. Upper and lower abutment edge surfaces 21′, 21″ each are preferably shallow V-shaped and from vertical datum plane Y, Y extend oppositely outwardly and forwardly toward front face 13 of the lifter (see abutment edge surfaces 21″R, 21″L of lower abutment rib structure 19″ in FIG. 5). In certain embodiments of the invention it may be desirable to form a lifter (11) without abutment rib structures (19′, 19″); however, rib structures 19′, 19″ provide spring turn abutment and guiding means during installation of a lifter and facilitate a more ready installation of the lifter R.

Left and right spring turn seating surfaces 25L, 25R each are configured generally in an arc-shaped channel conforming substantially to the circumferential diametric configuration of spring turns T′, T″ (see FIGS. 5 and 6). Spring turn seating surfaces 25L, 25R extend respectively oppositely perpendicularly of horizontal datum plane X, X and contour intersect respectively right and left upper and lower leverage surfaces 33′L, 33″L, 33′R, 33″R of lifter body structure 17.

Crowder lock lug structure 27L, 27R and spur locking lug structure 29L, 29R arranged respectively on opposite end portions of body structure 17 serve to guidingly constrain spring turns T′, T″ respectively in engagement with spring turn seating surfaces 25L, 25R when lifter 11 is arranged vertically and in an installed position (see FIG. 2). Crowder lock lug 27L and locking spur lug structure 29L are arranged respectively on opposite sides of seating surface 23L. In like manner, crowder lock lug 27R and spur locking lug structure 29R are arranged respectively on opposite sides of seating surface 23R (see FIG. 6). Upon clockwise quarter turn rotation of lifter 11 in installation of the lifter, seating surface 25L and locking lug structures 27L, 29L (see FIG. 5) will be moved clockwise upwardly and into engagement with the underside of spring turn T′. Simultaneously, seating surface 25R and locking lug structure 27R, 29R will be moved clockwise downwardly and into engagement with the upper side surface of spring turn T″. As lifter 11 is being installed and being moved a quarter turn from a horizontal to a vertical disposition, crowder lock lugs 27L, 27R simultaneously engage respectively spring turns T′, T″ and serve to cram or crowd the lifter inwardly toward the center axis of spring S. When lifter 11 is in an installed disposition, convexly arced locking surfaces 35L, 35R respectively of crowder lock lug 27L, 27R matingly engage respectively the radially inside circumferential peripheral portions of spring turns T′, T″ (see FIGS. 5 and 6).

Locking spur lug structure 29L, 29R arranged respectively on opposite end portions of lifter 11 each preferably include a pair of spur lock lugs 29′L, 29″L and 29′R, 29″R (see FIG. 3). Left and right arranged pairs of spur lock lugs 29′L, 29″L and 29′R, 29″R are arranged respectively symmetrically over and under horizontal datum plane X, X and are integrally connected respectively by vertically extending web structures 37L, 37R. Each lock spur lug 29′L, 29″L, 29′R, 29″R are alike and generally triangular pyramidal in shape. Lock spur lugs 29′L, 29″L include respectively structure defining oppositely oriented somewhat sharpened edges 39′L, 39″L. In like manner, lock spur lugs 29′R, 29″R include structure defining oppositely oriented edges 39′R, 39″R (see FIG. 3). Lock spur lug edges 39′L, 39″L and 39′R, 39″R are adapted to simultaneously lockingly engage respectively radially outside circumferential peripheral surfaces respectively of spring turns T′, T″ when the lifter is in an installed vertical disposition. It will be understood that the broken line representations of spring turns T′, T″ illustrate spring S in various positions for schematically illustrating the spring lifter in a horizontal partially installed disposition (FIG. 1) and a vertical permanently installed disposition (FIG. 2).

Wrench-engaging structure 31 preferably is arranged in the central portion of lifter body 17 and preferably is in the form of a square opening 41 extending horizontally through the lifter body. A wrench H having a square-sectioned tool bit B (broken line showing in FIG. 7) is of a type that may be used for installing lifter 11 in spring S. The lifter may be installed by inserting wrench bit B in socket opening 41, positioning the lifter horizontally between a selected two spring turns and then turning the wrench and lifter a quarter turn, and to the position shown in FIG. 2. If desired, two or more spring lifters (11) may be installed at selected locations in a spring (S) for further increasing the extension of the spring.

While I have shown and described a preferred embodiment of the present invention, it will be understood that various changes and modifications in structure may be made without departing from the spirit and scope of the invention.

I claim:

1. A small blocklike lifter adapted for use in lifting the upper turns of a vertically arranged large helical compression spring of the type utilized in a vehicle suspension system, said lifter being of a unitary form, generally rectangular, elongated in configuration and having a front and a back face and a horizontal and a vertical imaginary datum plane intersecting at the center of the lifter, said lifter including body structure arranged substantially symmetrically on opposite sides respectively of said vertical and horizontal datum planes and defining generally oppositely facing upper and lower leverage surfaces arranged respectively over and under said horizontal datum plane and including upper left, lower left, and upper right, lower right leverage surfaces arranged respectively on the left and right sides of said vertical datum plane, spring turn seating structure arranged at the opposite ends of said lifter body structure defining respectively leftward and rightward facing lift and right seating surfaces adapted to seatingly engage directly confronting lateral surface portions of adjacent turns of a helical spring, locking lug structure arranged on opposite ends of said lifter body structure including left crowder lug and spur lug structure projecting respectively leftward and on opposite sides of said left seating surface and including right crowder lug and spur lug structure projecting respectively rightward and on opposite sides of said right seating surface, and including wrench engaging structure adapted for torsional connection with a wrench-tool for installing said lifter between adjacent two turns of a helical compression spring.

2. The lifter of claim 1 which additionally includes abutment rib structure arranged respectively near the front face of said lifter and with said abutment rib structure defining longitudinally extending upper and lower abutment edge surfaces each oriented toward the back face of said lifter and projecting respectively upwardly and downwardly above and below said upper and lower leverage surfaces of said lifter body structure.

3. The lifter of claim 1 wherein said upper and lower leverage surfaces of said body structure protrude oppositely outwardly at the vertical datum plane of said lifter and wherein said upper left and lower left leverage surfaces extend leftward convergingly symmetrically from said vertical datum plane, and wherein said upper right and lower right leverage surfaces extend rightward convergingly symmetrically from said vertical datum plane.

4. The lifter of claim 1 wherein said locking structure arranged on opposite ends of said lifter body includes lug structure defining a crowder lug having a convexly arced locking surface adapted to substantially matingly engage the radially inside circumferential periphery of a spring turn portion of said helical spring and wherein said spur lug structure respectively of said locking structure arranged on each opposite end of said lifter body includes structure defining a pair of spur lock lugs arranged symmetrically over and under said horizontal datum plane; said pair of spur lock lugs of the lock structure of each end of said lifter body being adapted to lockingly engage radially outside circumferential peripheral portions of a spring turn; mutually adjacent directly confronting spring turn portions of a helical compression spring being adapted to be pressingly engaged with oppositely facing left and right seating surfaces of said lifter seating structure and to be lockingly retained in such configuration by said crowder lock lug structure and said pair of spur lock lugs on each end of said lifter body structure.

5. The lifter of claim 1 wherein said wrench-engaging structure is configured to matingly engage with a square-sectioned tool bit and wherein said wrench-engaging structure defines a centrally arranged horizontally extending square opening, the lifter being adapted to be installed between adjacent two turns of a helical spring by removably engaging said tool bit in said opening and turning said lifter a quarter turn.

6. A blocklike lifter adapted for use in lifting the upper turns of a vertically arranged large helical compression spring of the type utilized in a vehicle suspension system, said lifter being of a rigid unitary form, and includng generally oppositely facing spaced upper and lower wedge-shaped leverage means for insertion between adjacent turns of a helical compression spring in which said lifter is in a first position relative to said spring, means at the opposite ends of said lifter defining seating surfaces spaced apart a distance greater than said leverage means for engaging the adjacent turns of a helical compression spring when said lifter is in a second position relative to said spring, and tool engaging means for engaging a tool for turning said lifter from said first position to said second position to spread the adjacent turns of the helical compression springs.

References Cited

UNITED STATES PATENTS 3,091,448   5/1963   Kieffer _____ 267—61
3,330,548   7/1967   Starnes _____ 267—61

JAMES B. MARBERT, Primary Examiner